United States Patent [19]

Saito et al.

[11] Patent Number: 5,083,632
[45] Date of Patent: Jan. 28, 1992

[54] SADDLE TYPE OFF-ROAD VEHICLE HAVING A STORAGE RECEPTACLE

[75] Inventors: Kazuhiko Saito, Rancho Palos Verdes; Yoshio Oka, Hermosa Beach, both of Calif.

[73] Assignee: Honda Giken Kogyo Kabushiki Kaisha, Tokyo, Japan

[21] Appl. No.: 336,829

[22] Filed: Apr. 12, 1989

[51] Int. Cl.⁵ .............................................. B62D 61/06
[52] U.S. Cl. ................................... 180/215; 296/371
[58] Field of Search .............. 180/210, 215, 219, 210, 180/211, 252; 296/37.16, 37.1, 37.5

[56] References Cited

U.S. PATENT DOCUMENTS

| | | | |
|---|---|---|---|
| 4,325,562 | 4/1982 | Yamada et al. | 180/215 |
| 4,449,602 | 5/1984 | Pittman, Jr. | 280/282 |
| 4,726,439 | 2/1988 | Iwao et al. | 180/219 |

FOREIGN PATENT DOCUMENTS 59-128016  7/1984  Japan .

Primary Examiner—Andres Kashnikow
Assistant Examiner—Richard Camby
Attorney, Agent, or Firm—Irving M. Weiner; Joseph P. Carrier; Pamela S. Burt

[57] ABSTRACT

A saddle type, off-road vehicle, comprising a frame, an engine supported by the frame, at least one front wheel, a pair of rear wheels disposed on opposite sides of the frame, a seat supported on an upper portion of the frame, and a storage receptacle provided above the rear frame. The storage receptacle includes an element for reinforcing the strength and rigidity of an inner surface thereof and a partition for dividing the receptacle into a plurality of storage sections.

17 Claims, 9 Drawing Sheets

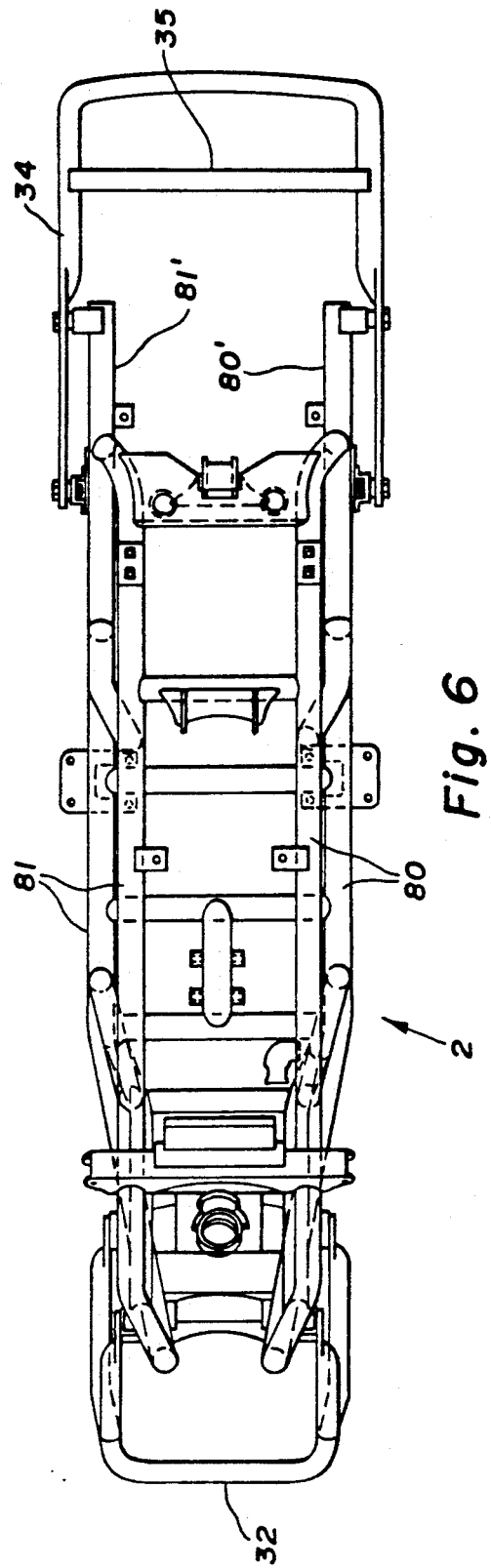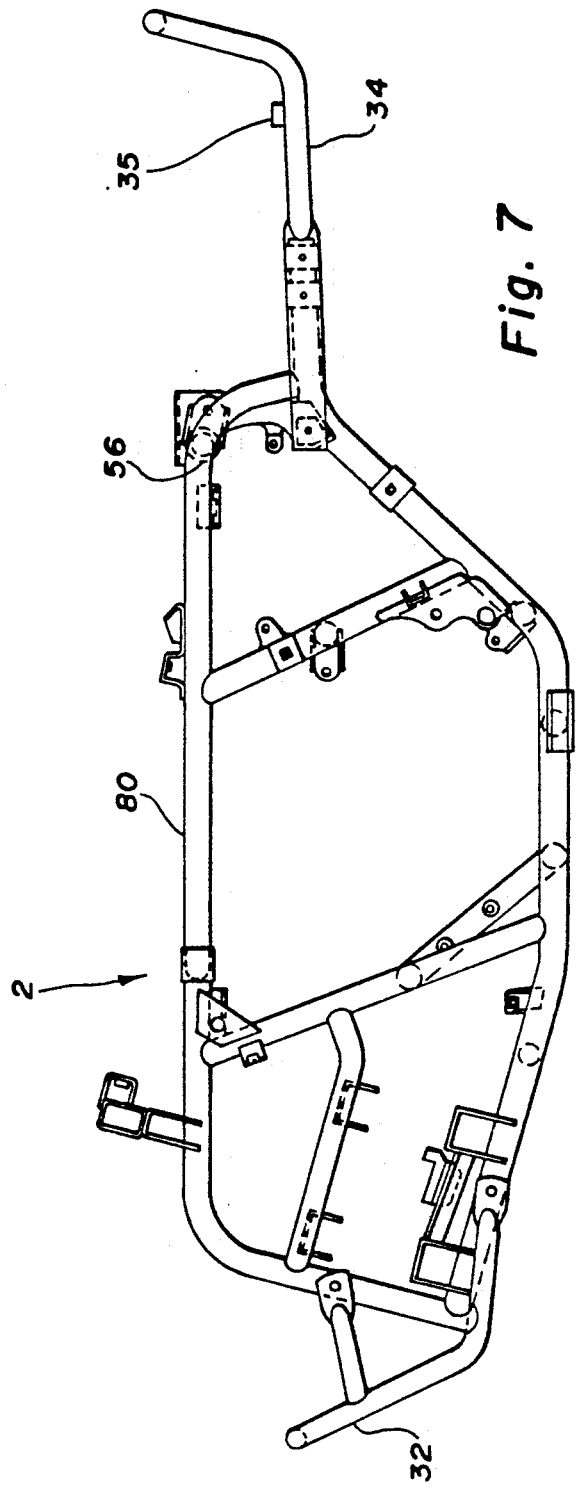

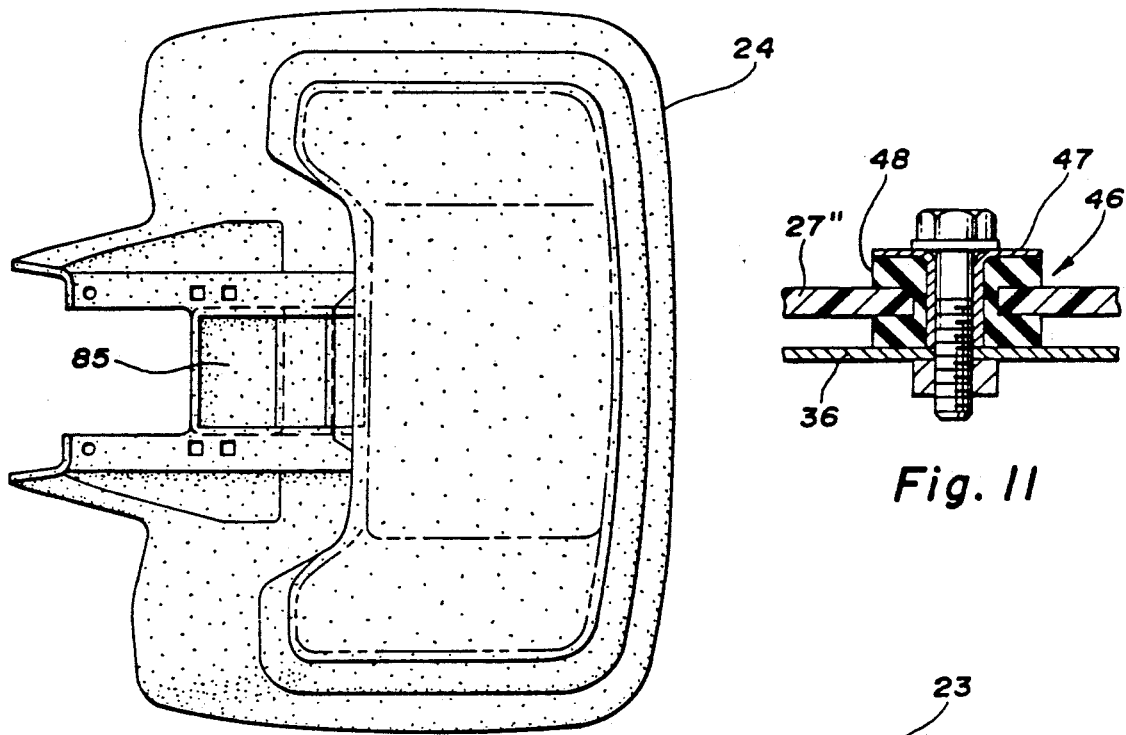
Fig. 8
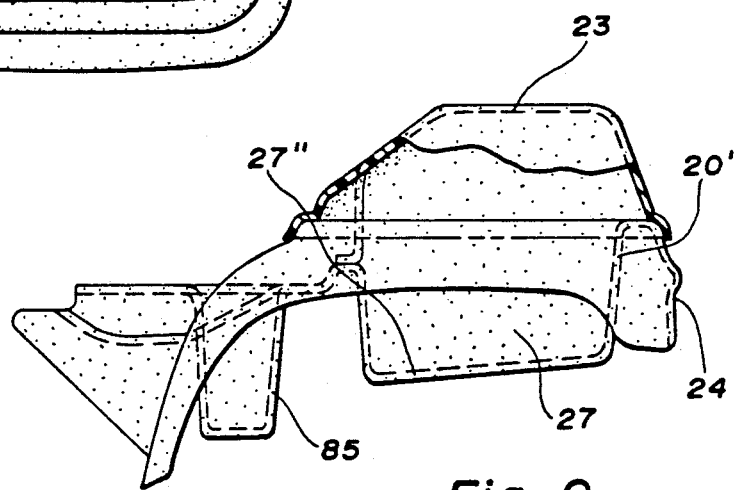
Fig. 11
Fig. 9
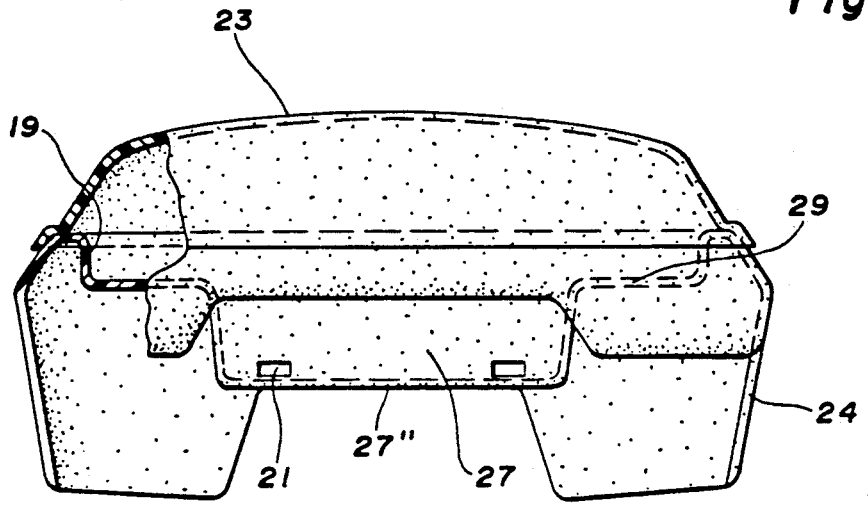
Fig. 10

SADDLE TYPE OFF-ROAD VEHICLE HAVING A STORAGE RECEPTACLE

BACKGROUND OF THE INVENTION

1. Field of the Invention

The present invention relates to a saddle type, off-road vehicle having a storage receptacle on a rear portion thereof. More particularly, the present invention relates to a saddle type, off-road vehicle having a saddle shaped seat similar to a motorcycle, a pair of front wheels and a pair of rear wheels each provided with a balloon type, low pressure tire and swingably supported by a vehicle frame, and a relatively large storage receptacle provided on a rear portion of the vehicle for conveniently storing and transporting relatively large and heavy loads with the vehicle.

2. Description of the Relevant Art

There are many known saddle type, off-road vehicles, including many three and four wheeled vehicles. These known vehicles are normally equipped with balloon type, ultra low pressure tires for traveling through and over many different terrains. Although these vehicles have been primarily associated with recreational purposes, they have also been used for purposes other than recreation, such as for use in farm activities, ranch activities, forest activities, etc., because of their great ability to travel over many different terrains.

Although many of the known saddle type, off-road vehicles are provided with a carrier rack at front and/or rear ends thereof, it is difficult to protectively carry or transport loads (relatively large loads such as tools, camping equipment, luggage, etc.,) with most of the known saddle type, off-road vehicles. Further, most of these vehicles are not provided with any covered or partially covered storage space, which would be desirable in many situations.

In contrast to the general complete absence of covered storage space, two known saddle type, three wheeled vehicles are disclosed in U.S. Pat. No. 4,325,562 and Japanese Patent Publication No. 59-128016, respectively, each of which includes a container positioned rearwardly of a rider's seat for containing loads such as items of clothing, a lunch, small articles of luggage, etc. The container disclosed in U.S. Pat. No. 4,325,562 is rather small and, correspondingly, is capable of containing only small objects. The container disclosed in Japanese Patent Publication No. 59-128016 is larger than that disclosed in the U.S. Patent, but to achieve this increased storage space it is necessary to position the container very closely above the vehicle's rear axle as shown in FIG. 4 of the publication. Such close positioning is undesirable because the container would tend to interfere with the vertical bouncing movements of the rear axle if the container is supported separately from the axle, and because the container would be subjected to excessive bouncing and vibrations if it supported together with the rear axle. Note, the Japanese Publication does not disclose how the container is actively supported on the vehicle, or how the container cooperates with the rear axle.

The present invention has been developed to overcome the above-discussed problems and disadvantages of known saddle type, off-road vehicles.

SUMMARY OF THE INVENTION

It is an object of the present invention to provide a saddle type, off-road vehicle having a relatively large storage receptacle provided at a rear portion thereof for conveniently storing and transporting relatively large and heavy loads on the vehicle.

It is another object of the present invention to provide such an off-road vehicle having an overall construction which is well suited for transporting large, heavy loads, and for use in other demanding work related activities.

It is still another object of the present invention to provide such an off-road vehicle in which the storage receptacle can be readily adapted for separately storing several different objects therein.

Yet another object of the present invention is to provide such an off-road vehicle having a removable container which is adapted to be securely fitted in or below the storage receptacle.

According to the present invention, a saddle type, off-road vehicle is provided which comprises a frame, an engine supported by the frame, at least one front wheel, a pair of rear wheels disposed on opposite sides of the frame, and a storage receptacle supported by the frame. The storage receptacle includes means for reinforcing the strength and rigidity thereof. Additionally, a partition may be provided in cooperation with the storage receptacle for defining a plurality of separated storage sections within the storage receptacle.

Also, a vehicle according to the present invention may also comprise a removable, enclosed container which is adapted to be securely fitted in or below the storage receptacle. The above and other objects, features and advantages of the present invention will become apparent from the following description when taken in conjunction with the accompanying drawings which illustrate a preferred embodiment by way of example.

BRIEF DESCRIPTION OF THE DRAWINGS

FIG. 6 is a plan view of the frame of the vehicle in FIGS. 1-4.

FIG. 7 is a side view of the frame in FIG. 5.

FIG. 8 is a plan view of an integral rear fender and storage receptacle unit of the vehicle shown in FIGS. 1-4.

FIG. 9 is a side view and FIG. 10 is a rear view, respectively, of the integral rear fender and storage receptacle unit shown in FIG. 8 with portions of the unit broken away to show additional structural details thereof.

FIG. 11 is an enlarged sectional view of a connection between the storage receptacle and a frame component.

DETAILED DESCRIPTION OF THE PREFERRED EMBODIMENTS

Figure 1:
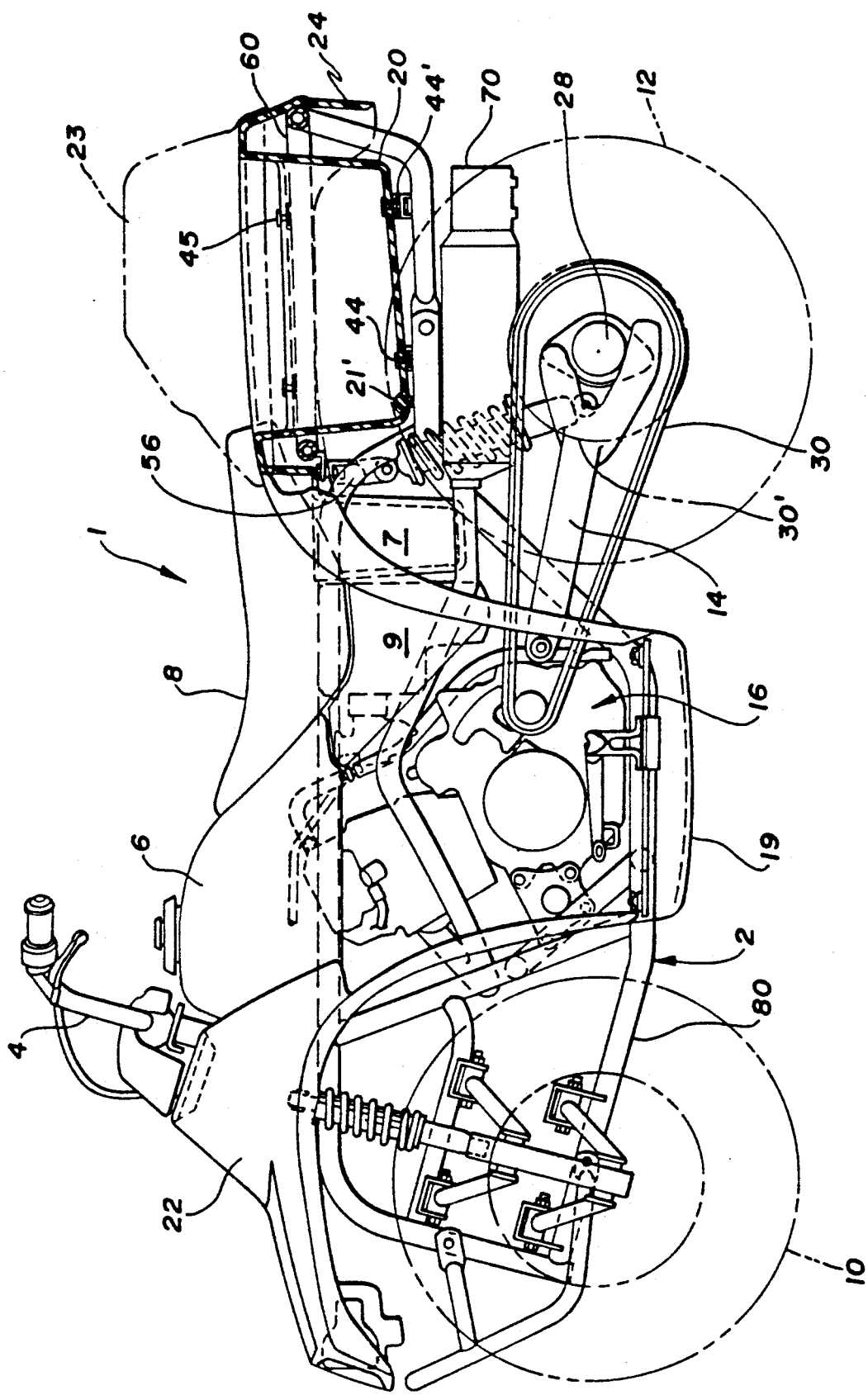
FIG. 1 is a side view of a saddle type, off-road vehicle according to the present invention.

Referring to FIGS. 1-4, there is shown a saddle type, off-road vehicle 1 according to a first embodiment of the present invention. The vehicle includes a frame 2 (shown more particularly in FIGS. 5 and 6) which supports a steering handle 4, a fuel tank 6, a rider's seat 8, a pair of front wheels 10 (each provided with a balloon type, ultra low-pressure tire) which are steered through the steering handle 4, a rear swing arm assembly 14, a drive unit 16 including an internal combustion engine and a transmission means for transferring rotative power to a pair of rear wheels 12 (each of which is also provided with a balloon type, ultra low-pressure tire), a pair of foot supports 18 provided on opposite sides of the frame, a battery 7, an air cleaner 9, a front fender 22 covering the front wheels 10, a rear fender 24 covering the rear wheels 12, and a storage receptacle 20 disposed rearwardly of the rider's seat 8.

Note that the rear swing arm assembly 14 vertically swingably supports a rear axle 28, and that the rear wheels 12 are connected to opposite ends of the rear axle. As shown in FIG. 1, the rear axle 28 is supported on a rear end of the rear swing arm assembly 14 so that it can be readily adjusted in the longitudinal direction of the vehicle, and is rotatably driven by the transmission means of the drive unit 16 which is depicted as including a drive chain 30 and a sprocket 30' fixed to the rear axle. It will be understood that although a sprocket and chain type transmission means is disclosed in FIGS. 1-4, other known types of transmission means, such as drive shaft type, could be used in vehicles according to the present invention. Also, it will be understood that a vehicle according to the present invention could have driven front wheels as well as (or as an alternative to) driven rear wheels.

Referring to FIGS. 1 and 3-6 the frame 2 is comprised of a pair of longitudinally extending, laterally spaced sections 80, 81 and a plurality of cross members which connect and reinforce the sections 80, 81. As best shown in FIGS. 1 and 6, the major part of each section 80, 81 is generally loop shaped when viewed from the side. Such a loop shape is preferred because it provides improved strength and rigidity. As also depicted, each of sections 80, 81 preferably includes a smaller rear part 80', 81', respectively, which extends integrally rearwardly from a lower portion of the major, loop shaped part, and which functions to support the storage receptacle 20.

Although the depicted construction of the frame 2 is preferred, it will be understood that a vehicle according to the present invention could include differently constructed frames. For example, the sections 80, 81 may not include rear projecting parts such as 80', 81', whereby the storage receptacle could be supported by upper or rear surfaces of the loop shaped parts. Further, the laterally spaced sections of the frame may not be loop shaped, but rather may be simply constructed as longitudinally extending members formed from cast aluminum or the like.

The vehicle 1 also preferably includes a front guard 32 extending forwardly and upwardly from a front, lower portion of the frame 2, and a rear guard 34 extending rearwardly and upwardly from the rear parts 80', 81' of the frame 2. As shown, a rear end of the rear guard 34 preferably extends upwardly and slightly rearwardly of a lower rear end of the storage receptacle 20, and the rear guard may include one or more cross members 35 connected laterally across intermediate portions thereof to provide added strength and rigidity. The front and rear guards 32, 34 may be connected to the frame 2 using appropriate fastening means, as shown, or may be formed integrally with the frame through welding or the like.

Vehicle 1 may optionally include a subframe 60 to provide additional support for the storage receptacle 20. As depicted, the subframe 60 is preferably constructed as a substantially rectangularly shaped ring which includes a rear laterally extending member of the rear guard 34 at the rear end thereof, while a front end thereof is supported on a cross member 56 interconnecting the laterally spaced sections 80, 81 of the main frame.

As shown in FIGS. 1-3 and 8-10, the rear fender 24 and the storage receptacle 20 are preferably constructed or formed as an integral unit. Such integral unit is further preferably composed of synthetic materials such as moldable plastics, fiberglass, etc., but may be constructed of other conventional materials such as sheet metal. The integrally constructed rear fender and storage receptacle unit is advantageous for many reasons, including relatively low manufacturing costs, increased structural strength and rigidity, attractive appearance, etc. Also as shown, a small receptacle 85 for substantially enclosing the battery 7 may be formed integrally with the rear fender 22 at a front end thereof.

The storage receptacle 20 preferably has a large opening defined in the upper surface thereof such that its upper end is substantially completely open, and whereby objects can be readily placed into and taken out of the storage receptacle. As depicted, the rear fender 24 preferably extends laterally outwardly and then downwardly around the full perimeter of the upper end of the storage receptacle thereby assuring that the upper end of the storage receptacle is sufficiently strong and rigid. Additionally, vehicle 1 preferably includes a lid 23 which can be readily secured over and removed from the open upper end of the storage receptacle 20. If desired, the lid 23 may be pivotally attached to the storage receptacle 20 or to the rear fender 24 through an appropriate hinge means, and a securing means including a latch mechanism and a lock may be provided for securing the lid in a closed position over the storage receptacle.

As depicted, the storage receptacle 20 preferably includes a lower section 27 and an upper or laterally extending section 29 which extends laterally of the lower section on both sides thereof. The lower section 27 extends downwardly from the laterally extending section 29 such that there is a stepwise structure defined between the lower and laterally extending sections. Similarly, a stepwise structure is defined between the laterally extending section 29 and the rear fender 24. Such stepwise structures may be sloped, as shown by the phantom lines in FIG. 9, in relation to the stepwise structure between sections 27, 29.

Additionally, a removable partition plate 27' (shown in FIG. 3) may be provided in the storage receptacle to separate the lower and laterally extending sections 27, 29 when desired. Preferably the plate 27' will be sized to fit over substantially the entire bottom wall 29' of the laterally extending section so that it will not shift during travel. If desired the plate 27' could be pivotally secured (like a lid) within the receptacle, and may comprise several sections hinged together. Further, the plate 27' may have a handle means associated therewith, such as a small opening formed near an outer edge thereof.

Figure 5:
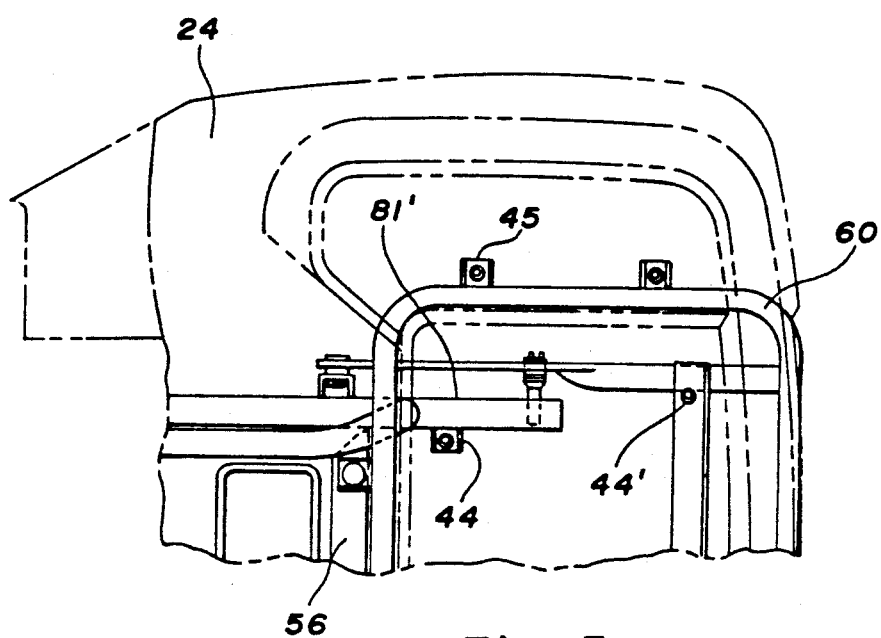
FIG. 5 is a plan view of a rear section of the vehicle shown in FIG. 1 which clearly shows the connections between the storage receptacle and the vehicle's frame.

Referring to FIGS. 1 and 5, the storage receptacle 20 is connected for support to the rear parts 80', 81' of the frame at connections 44 and to the rear guard at connections 44'. If the optional subframe 60 is utilized, lateral side portions thereof will extend beneath the stepwise structure between the lower and laterally extending sections 27, 29 and the laterally extending section 29 will be secured to the subframe at connections 45. An enlarged sectional view of an appropriate connection 44 is shown in FIG. 11. Particularly, a bottom wall 27" of the lower section of the storage receptacle 20 is secured to a cross member 35 of the rear frame 34 through a nut and bolt type fastener. Additionally, a bushing 46, including a metallic portion 47 and an elastic portion 48 is provided between the bottom wall 27" and the bolt.

Inasmuch as the rear parts 80, 81 are positioned at a substantially lower level than the upper portions of the major parts of the frame, the storage receptacle 20 is also positioned at a relatively low level. Such low positioning of the storage receptacle is advantageous because it assures good riding stability even if heavy objects are stored therein, and because the storage receptacle can be made relatively large without substantially increasing the size of the vehicle 1 relative to conventional vehicles that do not have storage receptacles.

As best depicted in FIG. 1, storage receptacle 20 is preferably located above the rear axle 28. Such location favorably increases the rigidity of the storage receptacle as disposed on the vehicle 1. Also, the bottom wall 27" of the lower section of the storage receptacle is preferably inclined forwardly and has at least one drain hole 21 formed in a forward end thereof. Such forward inclination permits the bottom wall 27" to be disposed at a relatively low position without interfering with vertical swinging movements of the rear axle 28 and the rear swing arm assembly 14, and also helps to prevent objects stored in the storage receptacle from moving around. The angle of inclination may be substantially larger than that depicted in the drawings, and the rear frame will be inclined in a manner corresponding to the bottom wall 27". Also, the drain holes 21 will preferably be provided with removable covers 21' which would be used to prevent water and the like from entering the storage receptacle through the drain holes when the vehicle is traveling over a wet terrain.

Figure 2:
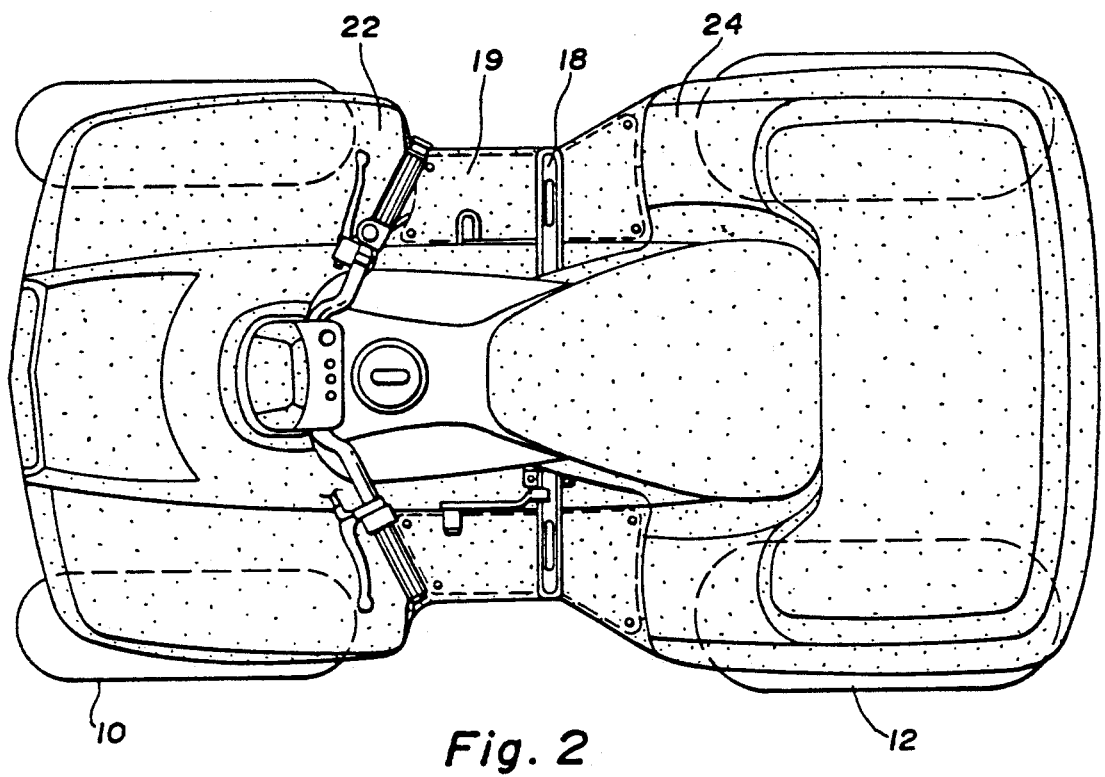
FIG. 2 is a plan view of the vehicle shown in FIG. 1.
Figure 4:
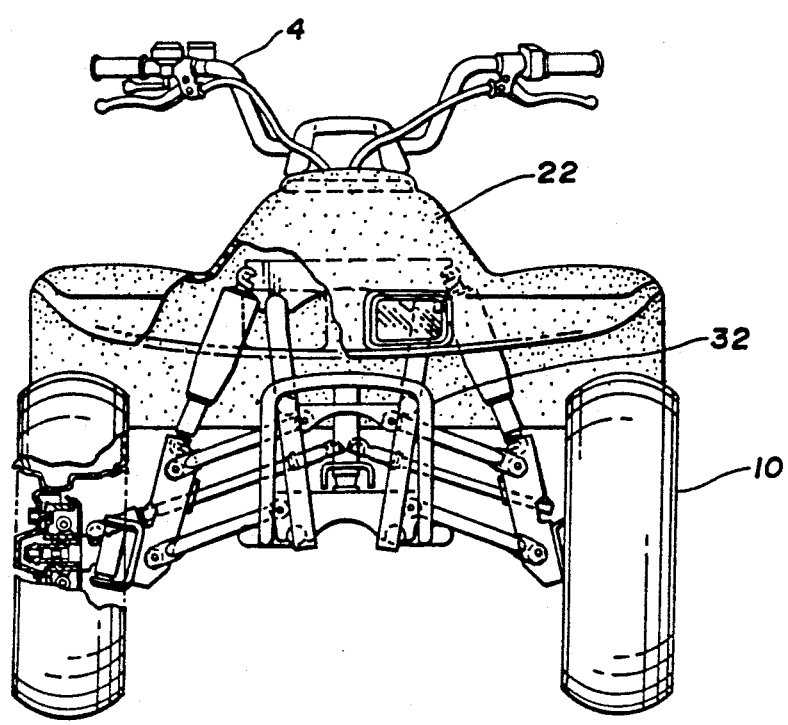
FIG. 4 is a front view of the vehicle shown in FIG. 1.

As shown in FIGS. 1 and 2, a pair of short panels 19 are preferably provided beneath the foot supports 18 for interconnecting front lower portions of the rear fender 24 to rear lower portions of the front fender 22. The short panels 19 enhance the strength and rigidity of the fenders 22, 24.

Figure 3:
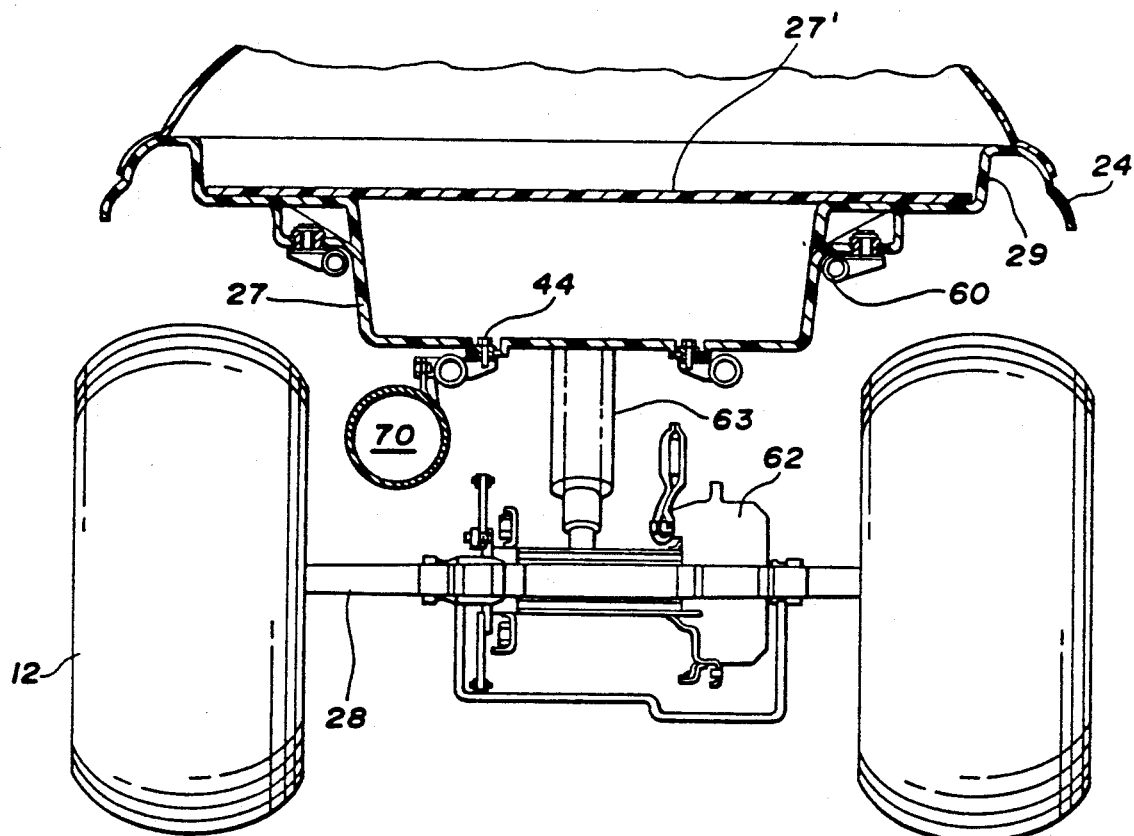
FIG. 3 is a rear view of the vehicle shown in FIG. 1.

Referring to FIGS. 1 and 3, a suspension means for the rear wheels 12 includes the rear swing arm assembly 14 and a cushioning unit 63. As depicted, the cushioning unit is preferably of a conventional type including a hydraulic damper and a coil spring provided in surrounding relation to the hydraulic damper. A lower end of the cushioning unit is pivotally supported by a bracket extending forwardly from a central portion of the rear axle 28, while an upper portion of the cushioning unit is pivotally supported by another bracket extending downwardly from a central portion of the cross member 56 interconnecting the laterally spaced sections 80, 81 of the frame. Although not shown, the vehicle's rear suspension may be modified to include a pair of laterally spaced cushioning units, each having a lower end thereof pivotally connected to a bracket extending forwardly from the rear axle 28, and having an upper end thereof pivotally connected to a bracket extending downwardly from a corresponding one of the laterally spaced sections 80, 81 of the frame. Further, the rear suspension means could be modified by connecting the lower end of the cushioning unit 63 to the swing arm assembly 14 through a pivoting link arrangement such that the entire cushioning unit would be positioned forwardly of the storage receptacle. Such a link arrangement would inlcude a first link pivotally connected at a rear end thereof to a laterally extending member of the swing arm assembly 14 and a second link pivotally connected between a front end of the first link and the lower portion 81 of the main frame. The lower end of the cushioning unit 63 would be pivotally connected to the pivoting connection between the first and second links, while an upper end of the cushioning unit could be connected to a cross member interconnecting the laterally spaced sections 80, 81 near the rear parts 80', 81' thereof. Again, this modification is not shown in the drawings.

As shown in FIGS. 1 and 3, the vehicle 1 also includes a muffler 70 which, in a depicted embodiment, extends longitudinally of the vehicle at one side thereof. The muffler 70 is preferably disposed below the bottom wall 27" of the lower section of the storage receptacle but substantially above the rear axle 28 so that it will not interfere with vertical swinging movements of the rear axle. Also in this regard, the muffler is preferably positioned in offset relation to driven means for the rear axle 28, such as the depicted sprocket 30' driven by the drive chain 30, as well as to a braking mechanism 62 provided on the rear axle. Such offset relationship further ensures that the muffler 70 will not interfere with the driven means and the braking means when the rear axle is vertically moved, and also ensures a better weight distribution or balancing of components at the rear end of the vehicle.

As shown in FIG. 1, the battery 7 and air cleaner 9 are conveniently supported by upper portions of the sections 80, 81 of the frame below the rider's seat 8. To permit ready access to the battery and air cleaner, the seat 8 will be pivotally connected to the upper portions of the frame such that a rear end of the seat can be swung forwardly upwardly.

Referring to FIGS. 12–16, there are shown several modifications to the storage receptacle of an integral rear fender and storage receptacle unit such as shown in FIGS. 1–4 and 8–10. Note that FIGS. 12–16 do not show front portions of the integral units, including a small receptacle for enclosing a battery, unlike FIGS. 1, 8 and 9.

Figure 12:
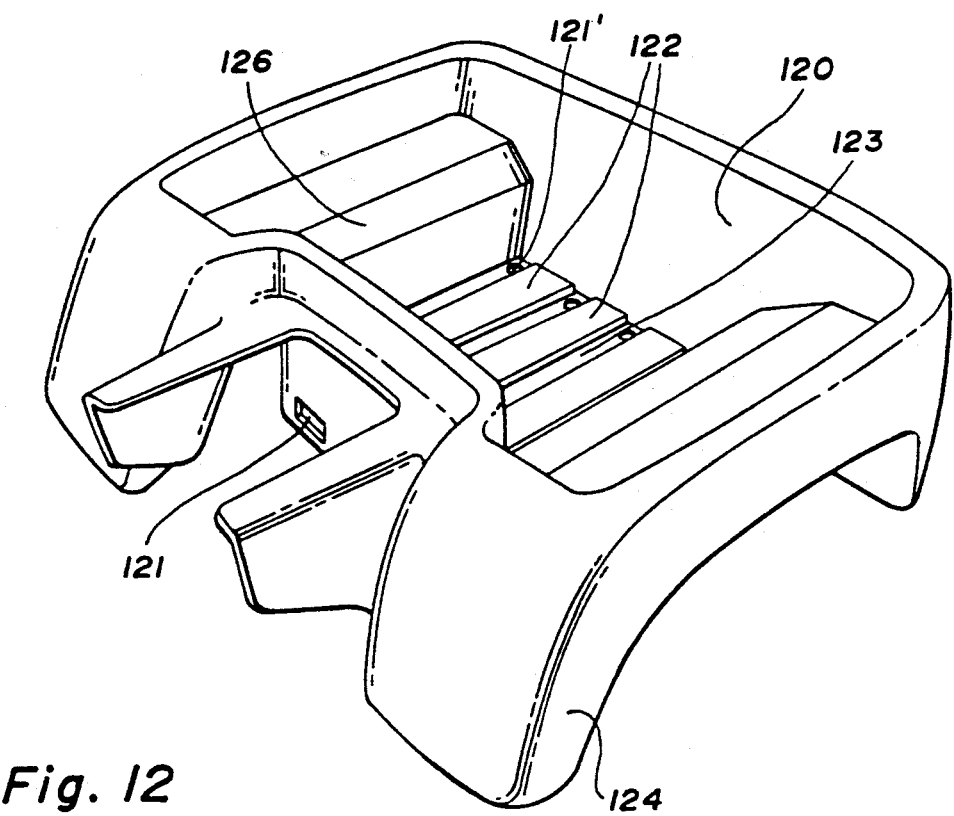
FIGS. 12-16 are perspective views of several modifications of the integral rear fender and storage receptacle unit of the vehicle shown in FIGS. 1-4.

In FIG. 12, the storage receptacle 120 is provided with a reinforcement means on an inner surface thereof. More particularly, the inner surface of the bottom wall of the storage receptacle will have at least one rib provided thereon, such as those indicated at 122. If more than one rib is provided on the inner surface a groove such as indicated at 123 will be defined between each pair of ribs. In this modification, the bottom wall of the storage receptacle extends substantially horizontally so that drain holes 121, 121' are formed in front and rear portions thereof, respectively. Also in this embodiment the stepwise structure defined between the lower and laterally extending sections 127, 129 of the storage receptacle tapers downwardly and inwardly from the laterally extending section to the lower section. Although not shown, it will be understood that the ribs 122 could be provided on more than one inner surface, or even all of the inner surfaces, of the storage receptacle 120. Similarly, the ribs 122 could extend laterally or diagonally of the vehicle rather than longitudinally.

Figure 13:
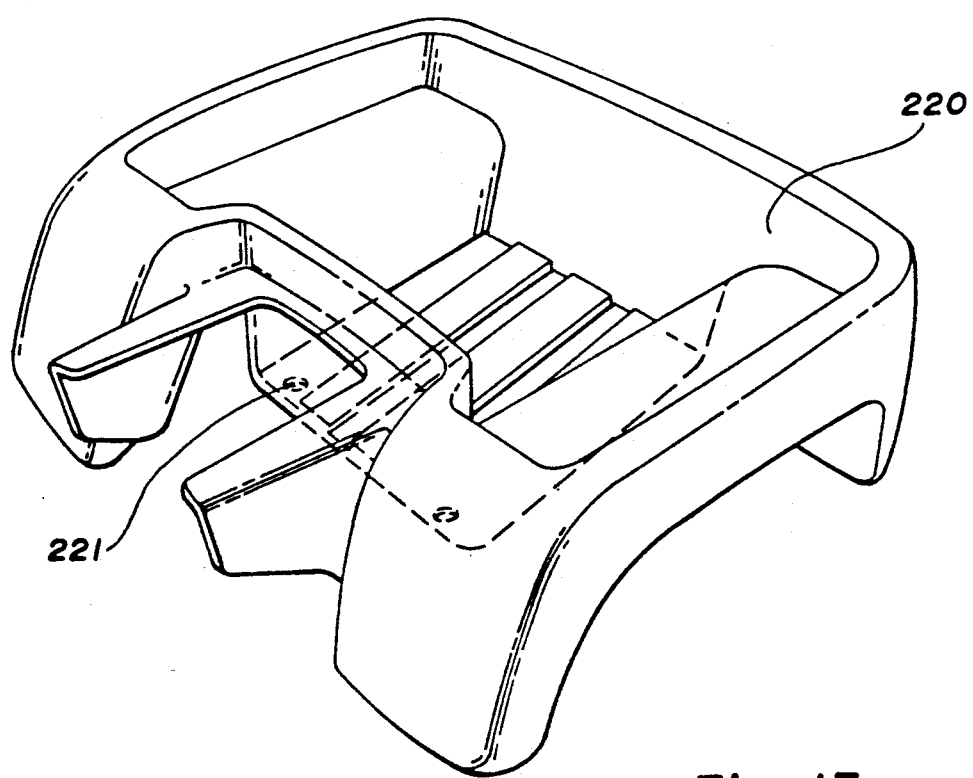

In FIG. 13, a modified storage receptacle 220 is disclosed which is substantially similar to the modified unit shown in FIG. 12, except that the bottom wall of the storage receptacle is forwardly inclined, and that the stepwise structure between the lower and laterally extending sections 227, 229 of the storage receptacle are not tapered. Note that drain holes 221 are provided only at the front end of the bottom wall of the storage receptacle 220 because it is forwardly inclined.

Figure 14:
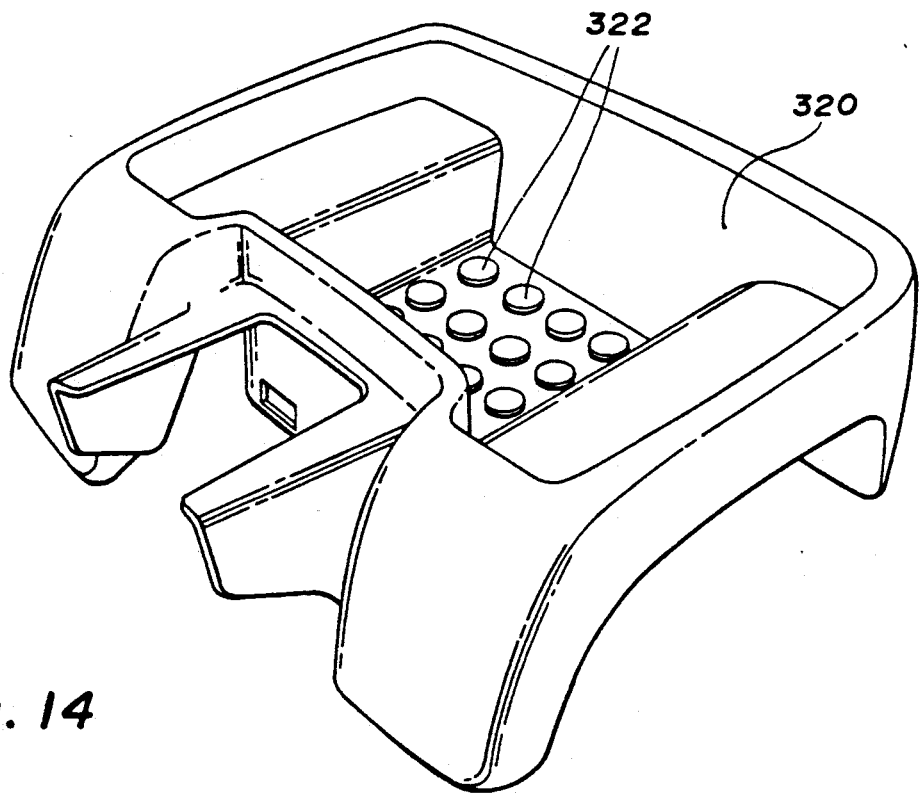

In FIG. 14, a modified storage receptacle 320 is disclosed which is substantially similar to that shown in FIG. 12 except that a plurality of circular protuberances 322 (rather than ribs) are provided as a reinforcing means on an inner surface of the bottom wall of the storage receptacle; and the stepwise structure between the lower and laterally extending sections 327, 329 of the storage receptacle are not tapered.

Figure 15:
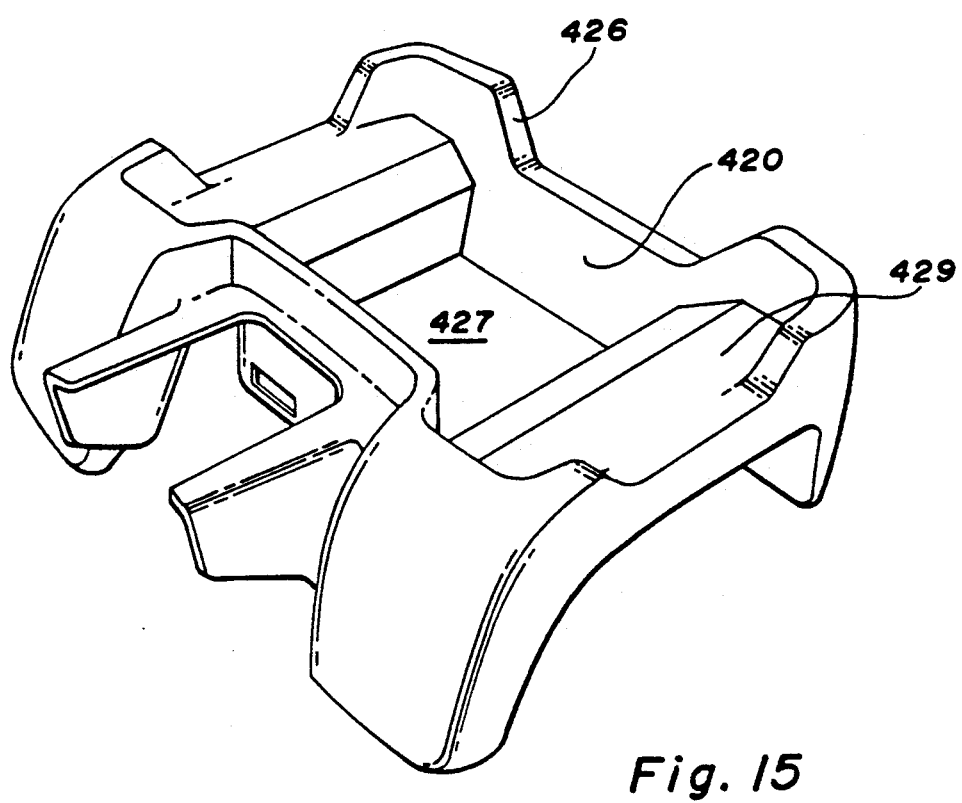

In FIG. 15, a modified storage receptacle 420 is shown which is substantially similar to the modified unit shown in FIG. 12 except that a reinforcing means is not provided on an inner surface of the bottom wall of the storage receptacle, and there is at least one recess or opening 426 defined in the side walls of the storage receptacle. Particularly regarding the second difference, at least one recess or opening 426 is preferably formed in an upper portion of at least one side wall of the storage receptacle 420 to permit relatively long objects such as lumber, pipes, etc., to be supported by the storage receptacle while an end portion or portions of each such object projects outwardly from a side of the storage receptacle. As depicted, it is also preferred that each recess 426 will extend downwardly to a point where a lower surface thereof is at the same level as (continuously planar with) an upper surface of a bottom wall 429' of the laterally extending section 429 of the storage receptacle.

Figure 16:
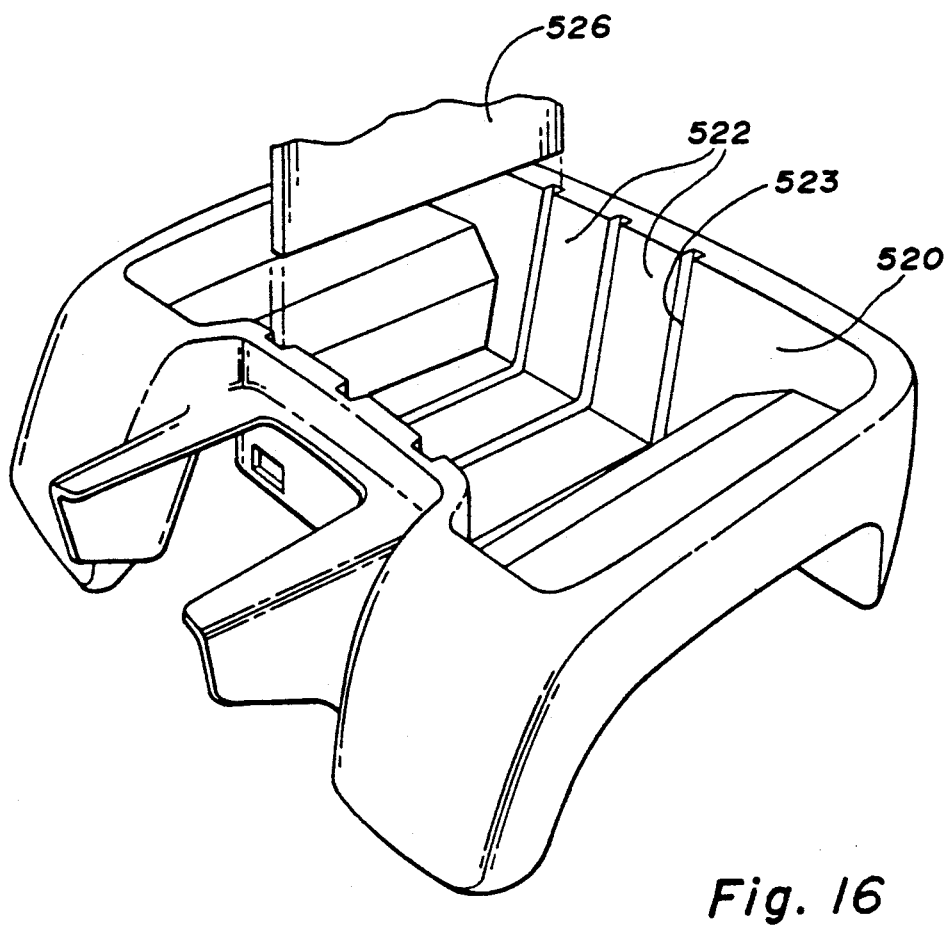

In FIG. 16, a storage receptacle 520 is shown which is substantially similar to the receptacle 20 shown in FIG. 1. except that the receptacle 520 includes a plurality of ribs 522 which are formed continuously along inner surfaces of front, bottom and rear walls thereof, and have grooves 523 defined therebetween. Further, one or more partition plates 526 are provided which are adapted to be selectively fitted in one or more of the grooves 523 for dividing the inner space of the storage receptacle 520 into a plurality of separate or isolated storage sections. If desired, the ribs 522 and grooves 523 may extend laterally or diagonally of the storage receptacle rather than longitudinally thereof.

Figure 17:
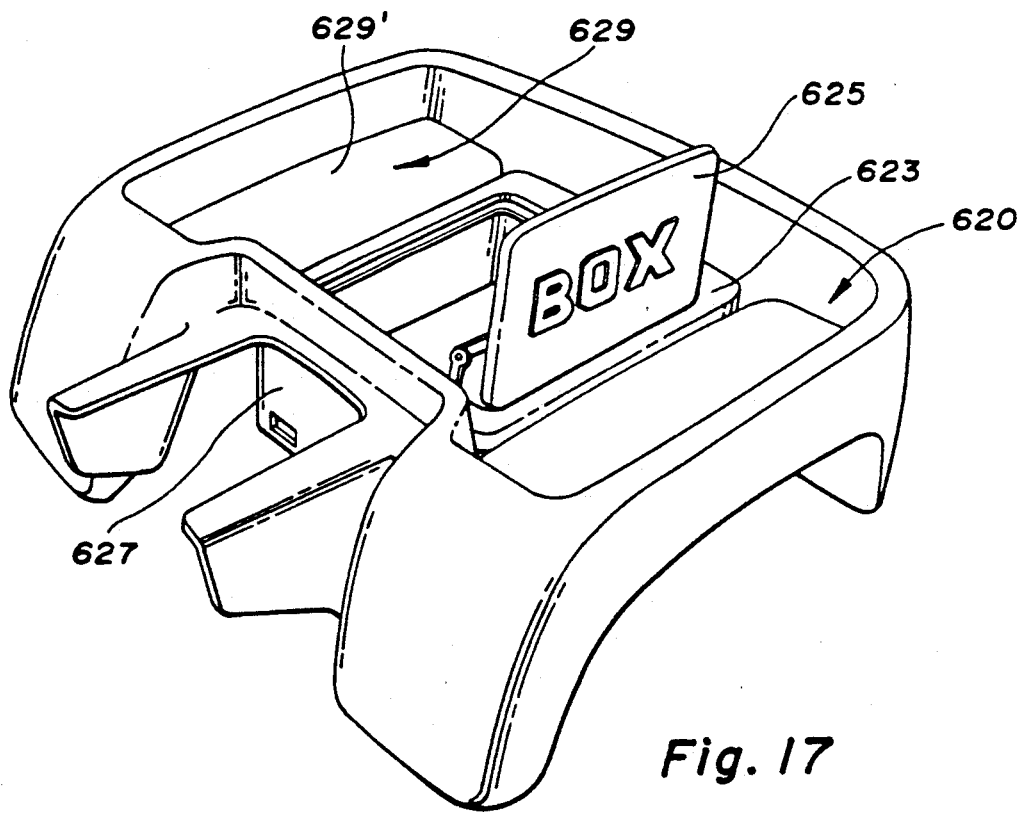
FIG. 17 is a perspective view of a removable container disposed in a central section of the integral rear fender and storage receptacle unit of the vehicle shown in FIGS. 1-4.

In FIG. 17, a storage receptacle 620 is shown which is substantially identical to the receptacle 20 shown in FIGS. 1-4 and 8-10 except that a removable container 623 is provided which is adapted to be fitted in the lower section 627 of the storage receptacle. The container 623 will preferably have a lid 625 pivotally provided on an upper surface thereof. Further, it is preferable that the upper surface of the container, including the lid 625, will be disposed at the same level as the upper surface of a bottom wall 629' of the laterally extending section 629 of the storage receptacle such that the upper surface of the container and the lower surface of the laterally extending section are substantially continuously planar with each other. The removable container 623 is preferably provided with a handle means (not shown) so that it can be easily placed in and removed from the receptacle 620.

Figure 18:
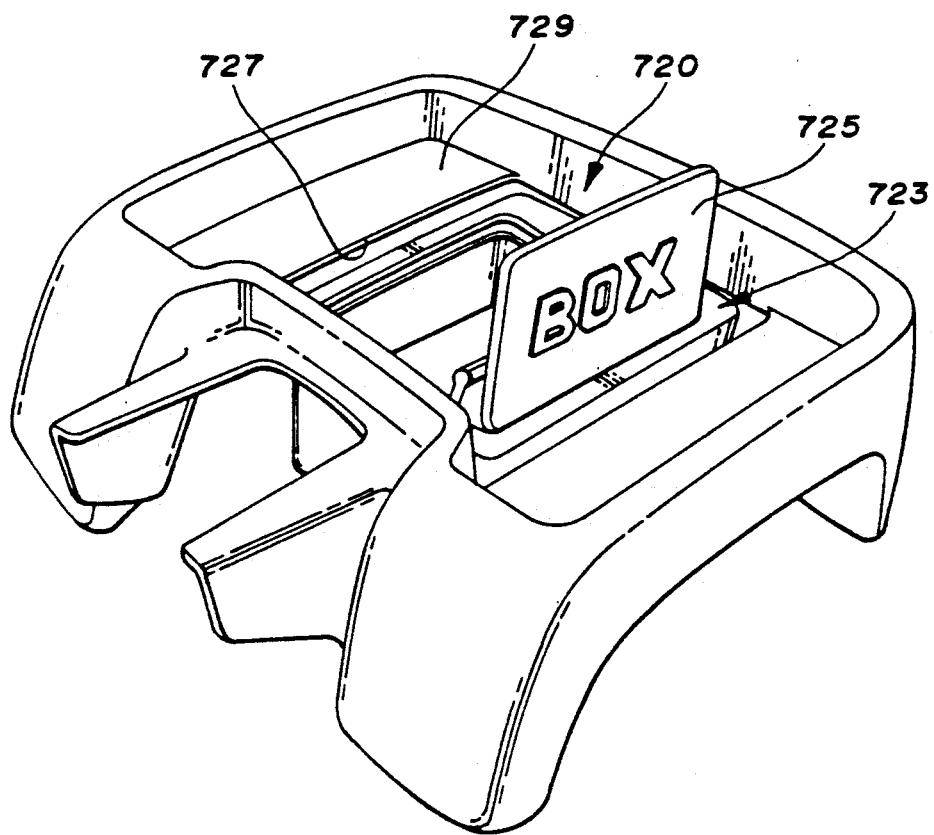
FIG. 18 is a perspective view similar to FIG. 17, but in which the integral rear fender and storage receptacle unit has been modified by defining a large central opening in a lower surface thereof and the removable box is disposed in and below the opening defined in the lower surface of the storage receptacle.

Referring to FIG. 18, an integral rear fender and storage receptacle unit 620 is disclosed which is substantially identical to the modified unit shown in FIG. 17 except that the storage receptacle 720 has a large opening 727 defined in a central portion of a bottom wall 729 thereof, while a removable container 723 is provided in and below the opening 727. As depicted, and in a manner similar to the modification shown in FIG. 17, a lid 725 is pivotally connected to the container 723 and forms a portion of an upper surface thereof. Further, the upper surface of the container 723 is preferably disposed at the same level as an upper surface of the bottom wall 729 of the storage receptacle such that the upper surface of the container and the upper surface of the bottom wall are substantially continuously planar.

Figure 19:
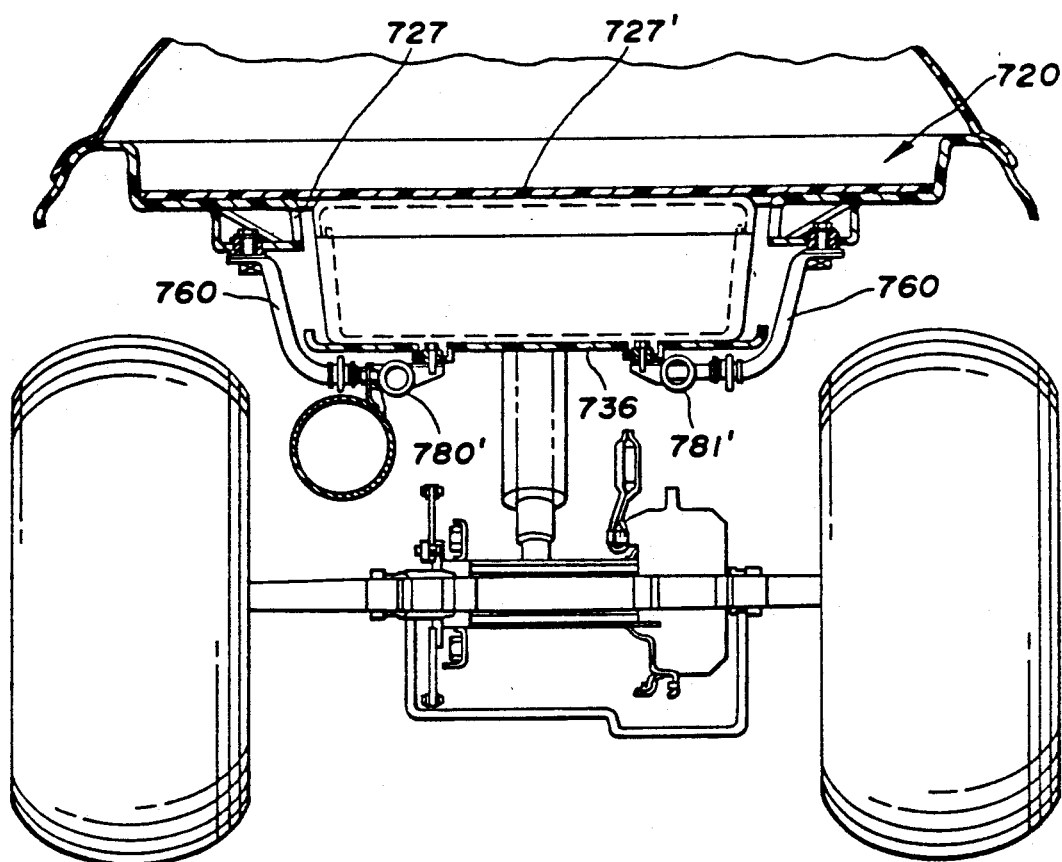
FIG. 19 is a rear view similar to FIG. 3, but including the modified rear fender and storage receptacle unit and the removable box of FIG. 18.

Referring to FIG. 19, there is shown a rear sectional view of a vehicle similar to that shown in FIG. 3, but in which the modified rear fender and storage receptacle 720 of FIG. 18 is provided thereon. As depicted, the storage receptacle 720 will preferably be supported by a plurality of subframe members 760 (preferably two on each lateral side) which extend outwardly and upwardly from rear parts 780', 781' of the frame, while the removable box 723 will be separately supported by the rear parts 780', 781'. If desired, a support plate 736 may be connected to the upper surfaces of the rear parts 780', 781' through appropriate connections, whereby the removable container 723 would be supported on the plate 736 rather than being directly supported on the rear parts. Alternatively, the storage receptacle 720 may be supported on a rectangular ring shaped subframe such as the subframe 60 shown in FIGS. 1-5.

Additionally, a removable partition plate 727', similar to the plate 27' discussed in relation to FIGS. 1 and 3, would be provided for placing over the opening 727 when desired. Preferably, such plate 727' would be sized so as to fit over substantially the entire bottom wall 729 of the storage receptacle. Althoug not shown, the removable plate 727 will have one or more openings provided near outer edges thereof to define a handle means for the plate. Similarly, the removable container 723 may be provided with a handle means, although such handle means are not shown in the drawings.

Although there has been described what is at present considered to be the preferred embodiment of the invention, it will be understood that the invention can be embodied in other specific forms, and that many changes and modifications can be made to the above-described structures without departing from the spirit or essential characteristics thereof. The depicted embodiment is, therefore, to be considered in all aspects as merely illustrative, and not restrictive. The scope of the invention is indicated by the appended claims rather than the foregoing description.

We claim:

1. A saddle type off-road vehicle, comprising:
a frame;
an engine supported by said frame;

at least one front wheel;
a pair of rear wheels disposed on opposite sides of the frame;
a seat supported on an upper portion of the frame;
a storage receptacle supported by the frame;
said storage receptacle including means for reinforcing the strength and rigidity thereof; and
a removable partition which is adapted to be selectively fitted in said storage receptacle.

2. A vehicle according to claim 1, wherein:
said reinforcing means includes at least one rib formed on an inner surface of at least a bottom wall of the storage receptacle.

3. A saddle type, off-road vehicle, comprising:
a frame;
an engine supported by said frame;
at least one front wheel;
a pair of rear wheels disposed on opposite sides of the frame;
a seat supported on an upper portion of the frame; and
a storage receptacle supported by the frame;
said storage receptacle including means for reinforcing the strength and rigidity thereof; and
said reinforcing means includes at least two ribs formed on the inner surface of the storage receptacle with a groove defined therebetween.

4. A vehicle according to claim 1, wherein:
said storage receptacle includes an upper section and a lower section; and
said removable partition includes a plate member which is adapted to be placed in the storage receptacle for isolating the upper and lower sections from each other.

5. A vehicle according to claim 4, wherein:
said plate member is adapted to be supported on a bottom inner surface of the upper section of the storage receptacle.

6. A vehicle according to claim 1, wherein:
said storage receptacle has a groove defined in an inner surface thereof; and
said partition includes a plate member which is adapted to be selectively, securely fitted in the groove.

7. A vehicle according to claim 1, wherein:
a bottom surface of the storage receptacle is inclined forwardly and has at least one drain hole formed in a lowest portion thereof.

8. A vehicle according to claim 1, wherein:
said reinforcing means includes a plurality of protuberances extending inwardly from an inner surface of at least a bottom wall of said storage receptacle, said protuberances being uniformly shaped.

9. A saddle type, off-road vehicle, comprising:
a frame;
an engine supported by the frame;
at least one front wheel;
a pair of rear wheels disposed on opposite sides of the frame;
a storage receptacle supported by said frame;
said storage receptacle occupying a large space at a rear portion of the vehicle and including a plurality of sections;
said storage receptacle including a lower section and an upper section;
a removable container which is adapted to be securely fitted in the lower section of the storage receptacle;
said removable container including a lid defining the upper surface of the container; and
the lid of the container is adapted to be substantially coplanar with the bottom inner surface of the upper section of said storage receptacle when the container is fitted in the storage receptacle.

10. A vehicle according to claim 9, wherein:
said storage receptacle includes a lower section and an upper section; and
at least a portion of said lower section is disposed below said frame and between the rear wheels.

11. A vehicle according to claim 10, wherein:
at least a portion of said upper section is positioned above said rear wheels.

12. A saddle type, off-road vehicle, comprising:
a frame:
an engine supported by the frame:
at least one front wheel;
a pair of rear wheels disposed on opposite sides of the frame;
a storage receptacle supported by said frame;
said storage receptacle occupying a large space at a rear portion of the vehicle and including a plurality of sections;
said storage receptacle having at least one recess defined in an upper portion of a side wall thereof, each said recess being adapted to support a stored object protruding from the storage receptacle;
said storage receptacle including an upper section and a lower section;
said at least one recess being formed in an upper portion of a side wall of the upper section; and
said at least one recess extending downwardly to a bottom inner surface of the upper section of said storage receptacle.

13. A saddle type off-road vehicle, comprising:
a frame;
an engine supported by the frame;
at least one front wheel;
a pair of rear wheels disposed on opposite sides of the frame;
a first storage receptacle supported by the frame; and
a second storage receptacle supported by the frame;
said first and second storage receptacles being separately supported by different frame components.

14. A saddle type off-road vehicle, comprising:
a frame;
an engine supported by the frame;
at least one front wheel;
a pair of rear wheels disposed on opposite sides of the frame;
a first storage receptacle supported by the frame; and
a second storage receptacle supported by the frame;
said second storage receptacle being selectively removable from and disposable within said first storage receptacle without requiring the use of any tools or fasteners.

15. A vehicle according to claim 14, wherein:
said first storage receptacle has a recess defined in a bottom portion thereof; and
said second receptacle is disposed in said recess.

16. A saddle type, off-road vehicle, comprising:
a frame;
an engine supported by the frame;
at least one front wheel;
a pair of rear wheels disposed on opposite sides of the frame;
a first storage receptacle supported by the frame; and a second storage receptacle separate from said first storage receptacle and supported by the frame;
said first storage receptacle having an opening defined in a bottom portion thereof;
said second storage receptacle being disposed at least partially below the opening defined in said first storage receptacle; and
said second storage receptacle having a lid, and an upper surface of said lid is substantially coplanar with said bottom portion of said first storage receptacle.

17. A vehicle according to claim 16, wherein:
said first and second storage receptacles are disposed at a rear portion of the vehicle.

* * * * *